(12) United States Patent
Maier

(10) Patent No.: US 9,950,339 B2
(45) Date of Patent: Apr. 24, 2018

(54) METHOD FOR PRODUCING A NON-UNIFORM COATING ON A SUBSTRATE

(71) Applicant: 3M INNOVATIVE PROPERTIES COMPANY, St. Paul, MN (US)

(72) Inventor: Gary W. Maier, Roberts, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/993,216

(22) Filed: Jan. 12, 2016

(65) Prior Publication Data

US 2016/0121362 A1    May 5, 2016

Related U.S. Application Data

(62) Division of application No. 13/518,747, filed as application No. PCT/US2010/060071 on Dec. 13, 2010, now Pat. No. 9,266,144.

(60) Provisional application No. 61/289,174, filed on Dec. 22, 2009.

(51) Int. Cl.
| | |
|---|---|
| *B05D 1/28* | (2006.01) |
| *B05D 5/00* | (2006.01) |
| *B05C 1/08* | (2006.01) |
| *B05C 1/16* | (2006.01) |
| *B05C 9/06* | (2006.01) |
| *B05D 7/00* | (2006.01) |
| *C09J 7/02* | (2006.01) |
| *D21H 23/58* | (2006.01) |
| *B05C 1/00* | (2006.01) |

(52) U.S. Cl.
CPC ............... *B05D 1/28* (2013.01); *B05C 1/00* (2013.01); *B05C 1/0813* (2013.01); *B05C 1/165* (2013.01); *B05C 9/06* (2013.01); *B05D 5/00* (2013.01); *B05D 7/5385* (2013.01); *C09J 7/0232* (2013.01); *D21H 23/58* (2013.01); *B05C 1/0834* (2013.01); *B05D 2252/02* (2013.01)

(58) Field of Classification Search
CPC ......... B05C 1/00; B05C 1/0813; B05C 1/165; B05C 1/0834; B05D 5/00; B05D 1/28
See application file for complete search history.

(56) References Cited

U.S. PATENT DOCUMENTS

| 3,312,005 A | 4/1967 | McElroy |
| 3,503,782 A | 3/1970 | Ayres |
| 3,741,786 A | 6/1973 | Torrey |

(Continued)

FOREIGN PATENT DOCUMENTS

| DE | 197 24 648 A1 | 12/1998 |
| JP | 54143450 | 11/1979 |

(Continued)

*Primary Examiner* — Xiao S Zhao
(74) *Attorney, Agent, or Firm* — Yufeng Dong

(57) ABSTRACT

A roll coater can be modified by the addition of one or more needle tubes that supply coating fluid to the roll coater in discrete locations across the face of the coating roll. The needle tubes supply a localized band of coating material onto the coating roll superimposed over the uniform coating layer already present on the surface of the coating roll from an upstream coating pond creating a stripe pattern over the uniform coating layer. By varying the relative speeds of the coating rolls in the coater, the width of the stripe can also be adjusted.

9 Claims, 2 Drawing Sheets

(56) References Cited

U.S. PATENT DOCUMENTS

| | | |
|---|---|---|
| 3,756,195 A | 9/1973 | Mercier |
| 3,881,445 A | 5/1975 | Nothiger |
| 4,172,655 A | 10/1979 | Wood |
| 4,256,877 A | 3/1981 | Karlsson |
| 4,259,379 A | 3/1981 | Britton |
| 4,273,325 A | 6/1981 | Rodewald |
| 4,357,373 A | 11/1982 | Cooper |
| 4,724,764 A | 2/1988 | MacPhee |
| 4,814,204 A | 3/1989 | Carey |
| 4,895,746 A | 1/1990 | Mertens |
| 5,015,500 A | 5/1991 | Garde |
| 5,026,591 A | 6/1991 | Henn |
| 5,032,460 A | 7/1991 | Kantner |
| 5,154,962 A | 10/1992 | Mertens |
| 5,202,190 A | 4/1993 | Kantner |
| 5,336,541 A | 8/1994 | Kobayashi |
| 5,770,267 A | 6/1998 | Bullock, Jr. |
| 5,824,748 A | 10/1998 | Kesti |
| 5,944,898 A | 8/1999 | Mendez |
| 6,022,050 A | 2/2000 | Kline |
| 6,074,480 A | 6/2000 | Kakuta |
| 6,217,940 B1 | 4/2001 | Kuni |
| 6,231,922 B1 | 5/2001 | Kline |
| 6,890,112 B2 | 5/2005 | Kline |
| 7,101,438 B2 | 9/2006 | Suzuki |
| 7,185,785 B2 | 3/2007 | Pearson |
| 2005/0074544 A1* | 4/2005 | Pacetti .................. B05C 1/022 427/2.1 |
| 2008/0105220 A1 | 5/2008 | Lee |

FOREIGN PATENT DOCUMENTS

| | | |
|---|---|---|
| JP | 2174961 | 7/1990 |
| JP | 2180662 | 7/1990 |
| JP | 2241575 | 9/1990 |
| JP | H0427462 | 1/1992 |
| JP | 7024384 | 1/1995 |
| JP | 7100416 | 4/1995 |
| JP | 07-156525 | 6/1995 |
| JP | H07-156525 | 6/1995 |
| JP | 08-006420 | 1/1996 |
| JP | 10128204 | 5/1998 |
| JP | 2002-263540 | 9/2002 |
| JP | 2004-167355 | 6/2004 |
| JP | 2004-188331 | 7/2004 |
| JP | 2005-195988 | 7/2005 |
| WO | WO 1987/07971 | 12/1987 |
| WO | WO 1998/17700 | 4/1998 |
| WO | WO 1999/11683 | 3/1999 |
| WO | WO 2003/038785 A1 | 5/2003 |
| WO | WO 2011/087828 | 7/2011 |

* cited by examiner

METHOD FOR PRODUCING A NON-UNIFORM COATING ON A SUBSTRATE

RELATED APPLICATION DATA

This is a divisional filing of application Ser. No. 13/518747, filed Feb. 19, 2013, which application is a national stage filing under 35 U.S.C. 371 of PCT/US2010/60071 filed Dec. 13, 2010, which claims priority to U.S. Application No. 61/289,174, filed Dec. 22, 2009, the disclosure of which is incorporated by reference in its/their entirety herein.

BACKGROUND

Roll coaters are commonly used to coat substrates with various coating compounds. Roll coaters can apply either a very uniform overall coating by use of a solid coating roll, or a discontinuous striped coating by use of a grooved coating roll.

SUMMARY

The inventor has determined that for some applications it is desirable to have an overall uniform coating on a substrate and superimposed over the uniform coating a non-uniform coating such as a plurality of stripes. Such coating profiles can be useful when applying water based, low adhesion, backsize coatings during the manufacture of adhesively attachable, repositionable writing notes. Since individual repositionable notes only have an adhesive portion at the top of the note, a release or low adhesion coating is only needed in this discrete area. This implies that a stripe coating application method would be suitable to save on coating material and costs.

However, the low adhesion coating resides on the writing surface of the repositionable note. A stripe coating may be visually detectable, depending on the color of the repositionable notes, since only a portion of the writing surface is coated. Alternatively, a non-uniform writing surface can be created by stripe coating. Ink reception into the paper may be affected by the presence or absence of the low adhesion coating. Thus, a stripe coating can be unacceptable to consumers when using the repositionable note. This implies that an overall coating of sufficient thickness to act as a low adhesion coating is required.

In order to save on coating material costs, it would be desirable to coat one surface of the repositionable notes with an overall low adhesion coating to ensure that visual and writing variations are not apparent, and with a stripe coating in areas where an adequate release coating is needed to ensure removability of each repositionable note from the stack of notes. Thus, a non-uniform coating having a uniform thinner first coating weight and a second coating of stripes over the thin coating is desirable. This reduces material costs when compared to applying a uniform thicker coating over the entire surface.

The inventor has determined that such a coating can be applied in one-step by modifying a conventional roll coater. Previously, a non-uniform coating as described above would require a two-step process in a roll coater: First, applying a uniform coating layer with a solid roll in the coater, and secondly, applying the stripe pattern coating over the uniform layer by replacing the solid roll with a grooved roll and running the substrate through the coater a second time. Replacing the two-step process with a one-step process significantly reduces factory costs to make the repositionable notes.

The inventor has determined that a conventional roll coater can be modified by the addition of one or more needle tubes that supply coating fluid to the roll coater in discrete locations across the face of the coating roll. The needle tubes supply a localized band of coating material onto the coating roll superimposed over the uniform coating layer already present on the surface of the coating roll from an upstream coating pond creating a stripe pattern over the uniform coating layer. By varying the relative speed of the coating rolls in the coater, the width of the stripe can also be controlled thereby varying its width to that required based on the width of the adhesive band present on the repositionable notes. Alternatively or in combination with varying the roll speeds, the stripe width can also be varied by varying the coating material flow to the needle tubes.

Hence in one embodiment, the invention resides in a method of coating a substrate with a roll coater comprising: applying a first coating uniformly onto the face of a coating roll; applying a second coating in one or more discrete stripes over the first coating; and transferring the first and second coatings onto the substrate.

In another embodiment, the invention resides in a coating apparatus comprising a coating roll, a first coating applicator for applying a first coating onto the coating roll and a second coating applicator comprising at least one needle tube for applying a second coating over the first coating.

BRIEF DESCRIPTION OF THE DRAWINGS

It is to be understood by one of ordinary skill in the art that the present discussion is a description of exemplary embodiments only, and is not intended as limiting the broader aspects of the present disclosure, which broader aspects are embodied in the exemplary construction.

Figure 1:
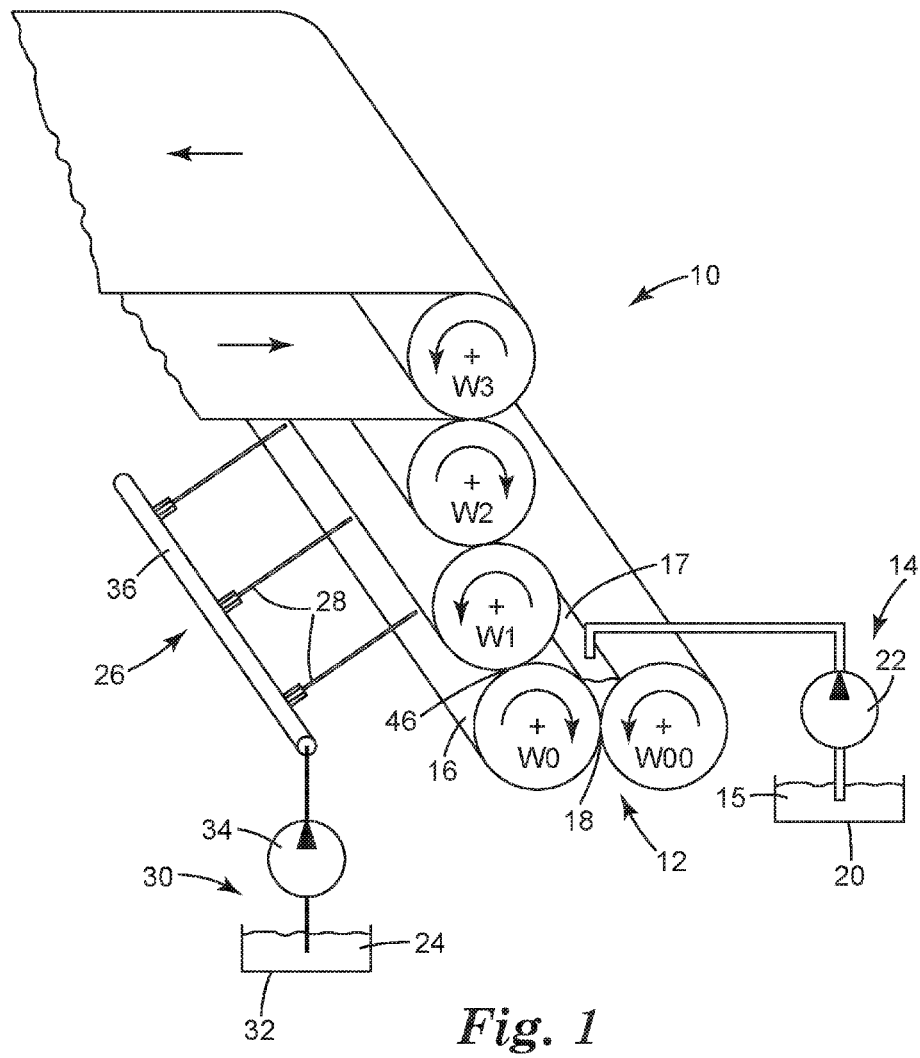
FIG. 1 is a perspective view of an apparatus for coating a substrate.

Repeated use of reference characters in the specification and drawings is intended to represent the same or analogous features or elements of the disclosure.

DEFINITIONS

As used herein, forms of the words "comprise", "have", and "include" are legally equivalent and open-ended. Therefore, additional non-recited elements, functions, steps or limitations may be present in addition to the recited elements, functions, steps, or limitations.

DETAILED DESCRIPTION

Referring to FIG. 1, a roll coater 10 is shown. The illustrated roll coater comprises a five roll coater, but the method of applying discreet bands of coating solution to the face of an applicator roll in a roll coater is applicable to other roll coaters such as reverse roll coaters, two roll coaters, three roll coaters, and four roll coaters.

The illustrated roll coater comprises a first coating applicator 12 having a first coating supply 14. The first coating applicator 12 applies a substantially uniform first coating 15 onto the face 16 of the W0 roll and comprises a coating pond 17 disposed in a nip 18 between the W0 roll and the W00 roll in the five roll coater. The first coating supply 14 comprises a first coating tank 20, a first coating pump 22, and piping to supply the first coating to the coating pond. Other first coating applicators 12 to apply a substantially uniform first coating 15 onto the face 16 of a coating roll can be used such as, enclosed feed or chamber doctor blade applicators, a doctor blade and a coating pond behind the doctor blade, a long slotted nozzle, dipping the coating roll into a coating pan, and a fountain coater.

After application of the uniform first coating 15 onto the face 16 of the W0 roll, a second coating 24 is applied in one or more discrete bands onto a coating roll by a second coating applicator 26. The second coating applicator 26 comprises one or more needle tubes 28 located at predetermined cross machine positions along the face of the W0 roll fluidly connected to a second coating supply 30. The second coating supply 30 can comprise a second coating tank 32, a second coating pump 34, and piping drawing the second coating 24 from the second coating tank 32 and feeding a manifold 36 to which the needle tubes 28 are fluidly connected. Other second coating applicators 26 to apply discrete bands of second coating 24 onto the face of a roll after application of the first coating 15 such as a grooved coating roll nipped with the W0 roll opposite the W00 roll can be used.

Figure 3:
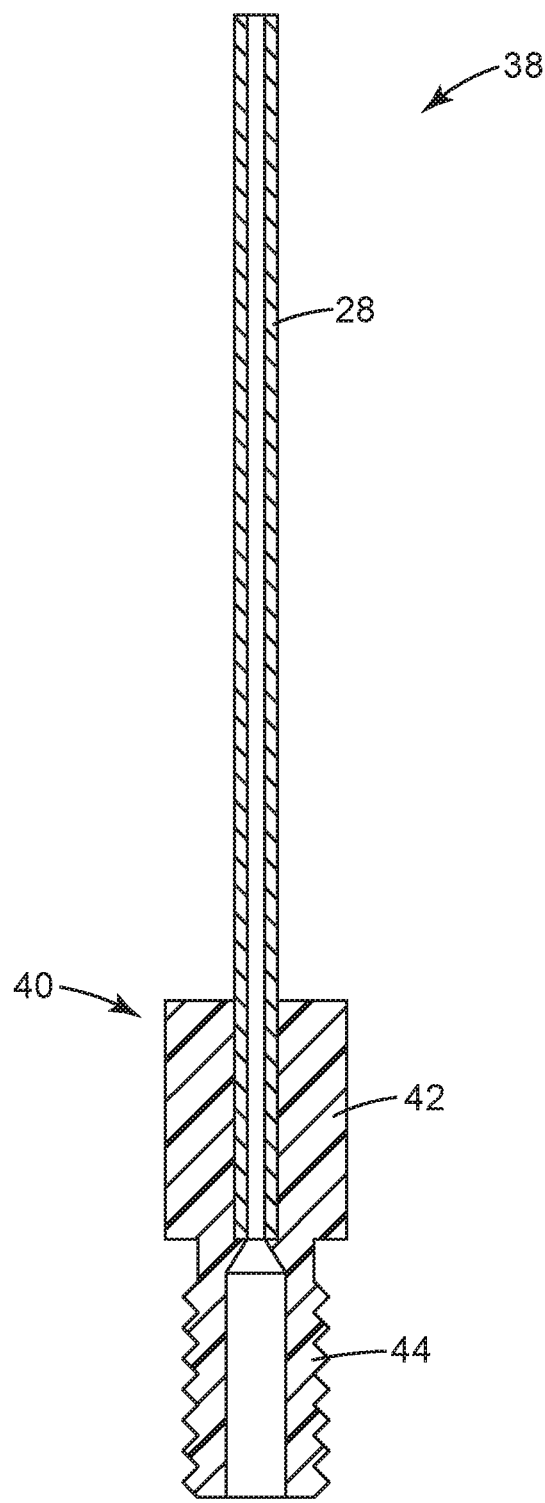
FIG. 3 is a cross section view of a needle tube assembly.

Referring now to FIG. 3, a needle tube assembly 38 comprising a needle tube 28 press fit into a coupler 40 is shown in cross section. The coupler 40 is typically made from nylon or metals such as stainless steel or brass. The coupler 40 has a hexagonal head 42 with a threaded cylindrical body 44 and a clearance hole drilled through the cylindrical body 44. A light press fit hole is drilled into the hexagonal head 42 and the needle tube 28 of the appropriate diameter and length is then press fit into the hexagonal head 42. The coupler 40 with attached needle tube 28 can then be screwed into a threaded hole in the manifold 36. Since the coupler 40 can be made from plastic and lower operating pressures are used in the manifold 36, typically no gaskets or sealants are required to prevent leaks once the needle tube assembly 38 is tightened onto the manifold 36. The needle tubes can be used with other types of couplers such as quick disconnect couplers, twist lock couplers, and bayonet couplers if desired. Such couplers are known for use when supplying pneumatic lines or hydraulic lines to machinery.

Desirably, the needle tubes 28 are made from stainless steel hypodermic needle tubing that is manufactured to make medical syringes. Other tubing materials can be used and the cross section of the needle tubes can be circular, square, triangular or other geometric shape. In one embodiment, the cross section of the needle tubes is circular. The internal diameter of the needle tubes and the length of the needle tubes can be selected based on the flow rate of the second coating 24 that is applied, the viscosity of the second coating, and the desired operating pressure of the second coating supply 30. Typically, the internal diameter of the needle tubes is between about 10 mils to about 100 mils (0.25 to 2.54 mm), such as between about 40 mils to about 70 mils (1.02 to 1.78 mm). Selection of the internal diameter of the needle tubes is more a factor of the amount of the second coating to be applied and its viscosity. Not all needle tubes connected to the manifold need to have the same internal diameter so it is possible to add more or less second coating at various cross machine direction locations.

The length of the needle tubes 28 can be adjusted to vary the manifold pressure needed to supply the desired amount of the second coating. Typically, the length of the needle tubes is between about 2" to about 8" (5.1 to 20.3 cm), such as between about 3" to about 7" (7.6 to 17.8 cm). Sufficient length is desired to produce a laminar flow of the second coating 24 in the needle tubes and to produce a minimally diverging stream of the second coating from the exit of the needle tubes as opposed to a spray or droplets such as would be produced by a spray nozzle. The stream can be continuous or intermittent (pulsed) as needed for the coating application.

Longer needle tubes can be required to direct the second coating into a nip between two coating rolls as opposed to applying the second coating onto the face of a coating roll. Generally, the needle tubes are sized to provide a second coating stream from the needle tubes at pressures between about 5 psi to about 20 psi (34.5 to 137.9 kilopascal); although, other pressures can be used. Enhanced cross machine uniformity on the amount of the second coating dispensed by each needle tube occurs as the length of the needle tubes is increased and the second coating supply pressure is increased.

The needle tubes can be placed to impinge the second coating stream onto the face of the coating roll. Typically such impingement would occur at an angle of less than 90 degrees to a line drawn tangent to the roll's surface at the point of impingement of the second coating stream. Generally the impingement angle between the longitudinal axis of the needle tubes and a line drawn tangent to the roll's surface at the point of impingement is between about 0 degrees to about 60 degrees.

Alternatively, the needle tubes can be placed to impinge the second coating stream at a nip between the coating roll and another coating roll such as the infeed nip 46 between the W0 roll and the W1 roll as shown in FIG. 1 or the infeed nip between the W1 roll and the W2 roll above the coating pond 17. By directing the second coating stream from the needle tubes into an infeed nip, improved retention of the second coating on the face of the coating roll occurs.

Additionally, it is possible to vary the second coating width that is applied to the substrate by varying the relative speeds of the coating rolls forming the infeed nip. In general, to increase the second coating width the speed of the W1 roll should be decreased relative to the speed of the W0 roll. To decrease the second coating width the speed of the W1 roll should be increased relative to the speed of the W0 roll. Retarding the speed of the downstream roll in the roll coater tends to reduce the take away rate of the second coating and spread out the second coating at the infeed nip. Conversely, increasing the speed of the downstream roll in the roll coater tends to increase the take away rate of the second coating reducing its spreading at the infeed nip. It is possible to slow down the W0 roll to such an extent that the individual strips applied to the substrate from the needle tubes merge into one another providing a continuous second coating on the substrate.

Alternatively or in combination with varying the coating roll speeds, the second coating width can also be varied by varying the amount of second coating solution supplied to the needle tubes. Supplying more second coating solution to the needles tubes will increase the second coating width while supplying less second coating solution to the needle tubes will decrease the second coating width.

The first coating applicator 12 and the second coating applicator 26 can apply the same coating solution or different coating solutions to the rolls in the roll coater. For some embodiments, the identical coating material can be applied and the amount of the first coating 15 placed onto the substrate can be adjusted in a conventional manor for the roll coater and the amount of second coating 24 placed onto the substrate can be changed by varying the pressure in the manifold 36 and size of the needle tubes 28. Alternatively, a similar coating material having the same active ingredients but at a different percent solids can be applied by the first and second coating applicators (12, 26). For example, a low percent solids first coating can be supplied by the first coating supply 14 to provide a low basis weight first coating 15 over the entire substrate and a high percent solids second coating can be supplied by the second coating supply 30 to provide a high basis weight second coating 24 in the stripe pattern.

Figure 2:
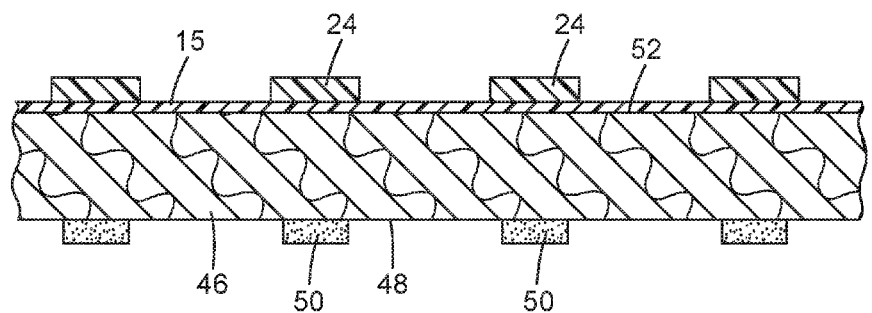
FIG. 2 is a machine direction, end view of a substrate coated with adhesive stripes on one side and a non-uniform low adhesion coating on the opposite side by the apparatus of FIG. 1.

Referring now to FIG. 2, a substrate 46 having coatings applied to both major surfaces of the substrate is illustrated. On the first major surface 48 of the substrate, a plurality of adhesive stripes 50 is present. The adhesive stripes can be located at positions along the width of the substrate where the top edge of the finished repositionable note is cut from the substrate. On the second major surface 52, a non-uniform coating is present, typically a low adhesion coating such as a mercapto functional silicone. The non-uniform coating comprising a first coating 15 uniformly applied to substantially the entire second major surface 52 and a non-uniform second coating 24 applied in stripes over the first coating. The second coating is applied to the substrate 46 in stripes generally opposite the adhesive stripes 50 on the first major surface 48 by the needle tubes 28. Generally, the width of the second coating 24 is slightly larger than the width of the adhesive stripes 50 can be controlled by the relative speeds of the coating rolls at an infeed nip as previously discussed.

EXAMPLES

Objects and advantages of this disclosure are further illustrated by the following non-limiting examples. The particular materials and amounts thereof recited in these examples as well as other conditions and details, should not be construed to unduly limit this disclosure. Unless otherwise noted, all parts, percentages, ratios, etc. in the Examples and the rest of the specification are by weight.

Substrate coating was performed on a five roll coater similar to FIG. 1 to demonstrate a one-step roll coating method to produce a coated substrate having a non-uniform low adhesion backside (LAB) coating on the second major surface of a paper substrate as illustrated in FIG. 3. A grape colored paper substrate was coated with the non-uniform LAB coating since stripes of this coating material is often visible on darker colored papers. To the first major surface of the paper an adhesive coat weight of about 0.75 gsf was applied in a stripped pattern. The adhesive comprised a composite pressure sensitive microsphere adhesive comprising two or more water insoluble polymers that are mixed wholly within the boundaries of polymeric microspheres as described in U.S. Pat. No. 5,824,748 entitled "Composite Pressure Sensitive Adhesive Microspheres," by Kesti, et al.

The LAB coating comprised a 20% solids in water solution of a mercapto functional silicone product number KF2001 commercially available from Shin-Etsu Corporation, Japan. On the second major surface, approximately 0.020 gsf of the LAB coating was applied in the stripped areas and approximately 0.010 gsf was coated in areas without the stripes. To achieve this coating profile, the 5 roll coater was operated with the W0 at roughly 5% of the web speed and with W1 at roughly 70-80% of the web speed. Varying the W0 roll speed allows for the first coating of LAB coat weight to be adjusted, while the LAB coat weight within the second coating stripe is adjusted by the LAB flow rate (speed of pump feeding the needle tubes) and the width of the LAB stripe. Adjustment of the W1 roll speed allows for the proper spreading of the LAB coating applied by the needle tubes in order to achieve a LAB coating stripe width slightly larger than the adhesive stripe width as shown in FIG. 2.

The coated paper substrate was converted into repositionable notes using conventional converting methods. It was noted that the non-uniform LAB coating pattern did not produce visible stripes on the writing surface of the repositionable notes since a LAB coating covered the entire writing surface of the repositionable note. It was also noted that the repositionable notes were separable from the stack of notes and usable for their intended purpose without unduly sticking together. The writing ability of the repositionable notes with various pens was also examined to make sure that the writing did not appear to be any different between areas on the writing surface having the low and high LAB coating weights. No differences in writing ability were observed. Further information on coated substrates produced by the method and apparatus of the invention is contained in PCT Publication No. WO2011/087828.

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of coating a substrate with a coating apparatus, the method comprising:
    applying a first coating uniformly onto the face of a coating roll;
    applying a second coating in one or more discrete stripes over the first coating; and
    transferring the first and second coatings onto the substrate,
    wherein the coating apparatus comprises a five roll coater including the coating roll, a W3 roll, a W2 roll, a W1 roll and a W00 roll, the substrate wrapping at least a portion of the W3 roll and entering the five roll coater at an infeed nip between the W3 roll and the W2 roll, the W1 roll nipped with the W2 roll, the coating roll nipped with the W1 roll, and the W00 roll nipped with the coating roll.

2. The method of claim 1 wherein the applying the first coating uniformly onto the face of a coating roll comprises supplying a coating pond at the infeed nip between the W00 roll and the coating roll with a first coating solution.

3. The method of claim 1 wherein applying the second coating in one or more discrete stripes over the first coating comprises supplying at least one needle tube with a second coating and impinging the second coating onto the face of either the W2, the W1, or the coating roll.

4. The method of claim 3 wherein an impingement angle between a longitudinal axis of the needle tube and a tangent line to the roll's surface at the point of impingement is between about 0 degrees to about 60 degrees.

5. The method of claim 3 wherein the second coating comprises a second coating stream exiting from the at least one needle tube.

6. The method of claim 1 wherein applying the second coating in one or more discrete stripes over the first coating comprises supplying at least one needle tube with a second coating and impinging the second coating into an infeed nip between the W2 and the W1 roll or between the W1 and the coating roll.

7. The method of claim 6 wherein the second coating comprises a second coating stream exiting from the at least one needle tube.

8. The method of claim 6 wherein a width of the one or more discrete stripes is varied by adjusting the relative speed between the rolls forming the infeed nip.

9. The method of claim 1, wherein the second coating is applied via at least one needle tube being disposed adjacent the coating roll on the side opposite the W00 roll.

\* \* \* \* \*